2 Sheets—Sheet 2.

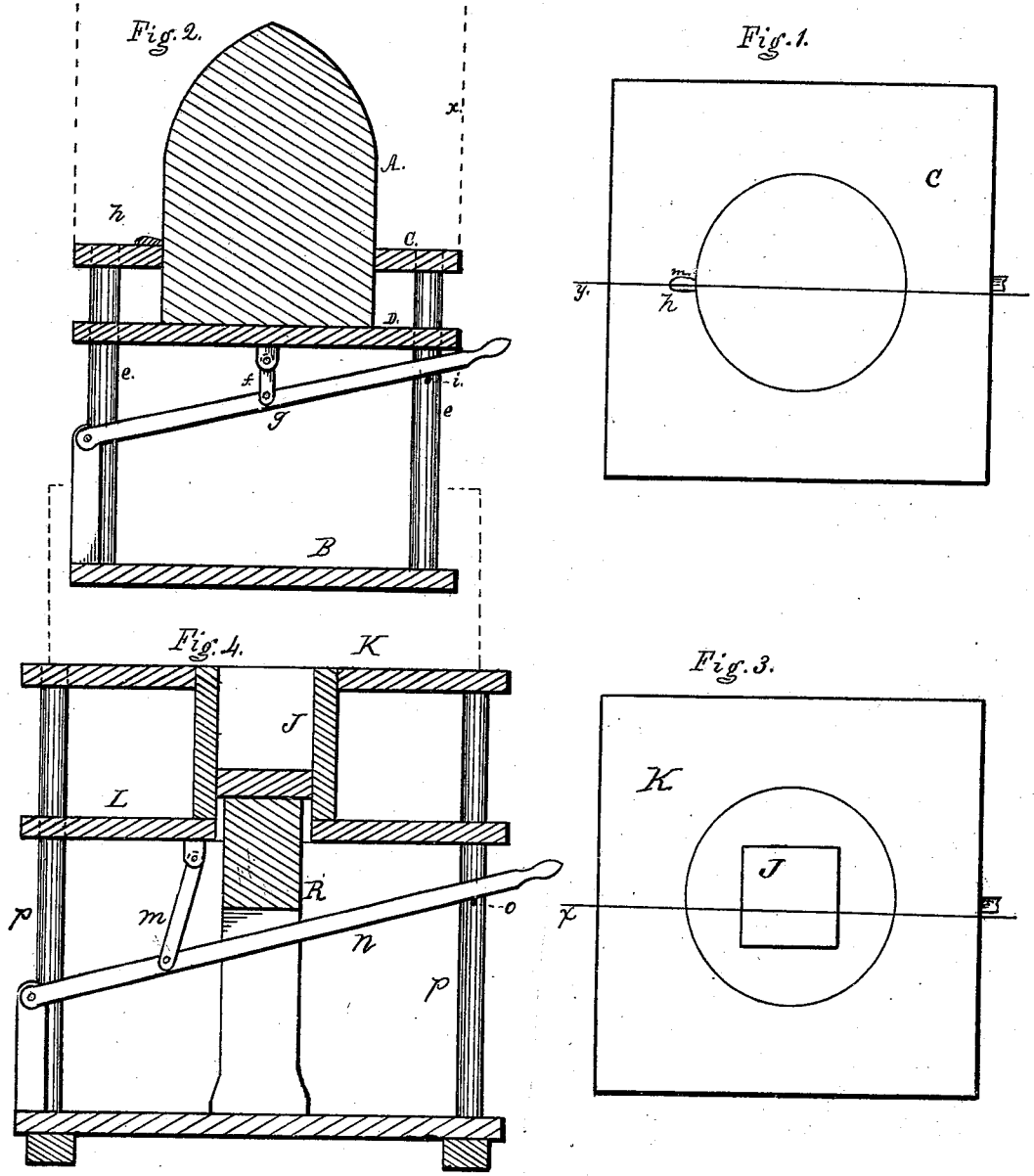

G. MATHESON.
Forming Plug for Welding Tube.

No. 227,635. Patented May 18, 1880.

Witnesses
A. C. Johnston
A. S. H. Johnston

Inventor
George Matheson.
By Johnston & Donn,
his attorneys.

UNITED STATES PATENT OFFICE.

GEORGE MATHESON, OF McKEESPORT, PENNSYLVANIA.

FORMING PLUGS FOR WELDING TUBES.

SPECIFICATION forming part of Letters Patent No. 227,635, dated May 18, 1880.

Application filed January 14, 1878.

*To all whom it may concern:*

Be it known that I, GEORGE MATHESON, of McKeesport, in the county of Allegheny, State of Pennsylvania, have invented a new and useful Improvement in Machines for Forming Molds for Plugs employed in Welding Tubes; and I do hereby declare that the following is a full, clear, and exact description thereof, reference being had to the accompanying drawings, and to the letters of reference marked thereon.

My invention relates to machines employed in forming molds for plugs which are employed in welding tubes; and my improvement relates to the construction of the machine used for forming the cope part of the mold, as hereinafter described and claimed.

In the accompanying drawings I have illustrated the machine for forming the drag part of the mold, as well as the improved machine for forming the cope, in order that the operation of forming a mold may be clearly understood.

Figure 5:
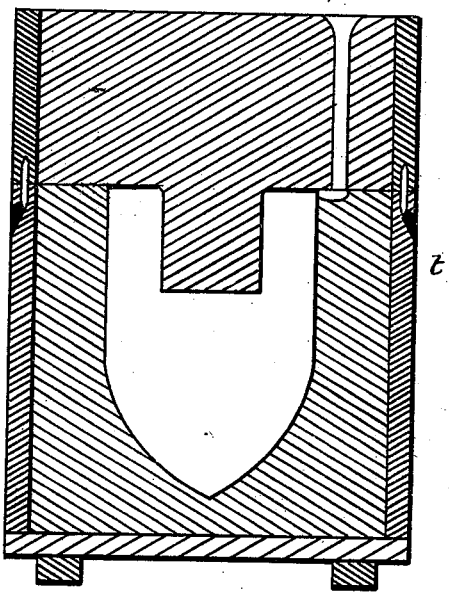
Figure 6:
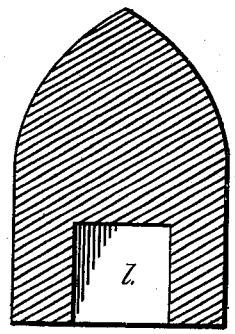

In the drawings, Figure 1 represents a plan view of one of the machines employed in forming the drag, and Fig. 2 is a vertical section of the same, taken on line $y$. Fig. 3 is a plan view of my improved machine for forming the cope part of the mold, and Fig. 4 is a vertical section of the same, taken on the line $x$. Fig. 5 shows the complete mold with the flasks fitted together, and Fig. 6 represents a plug which has been formed in the mold.

By my improved machine I secure a perfectly true plug and retain the outer shell upon the casting, thereby causing the plug to wear much longer, also dispensing with the labor, trouble, and cost of grinding and truing them. I also avoid the labor of making, drying, and setting of the cores for forming the necessary cavity in the plug, which is represented at $l$ in Fig. 6, which is a vertical section of a plug used in welding tubing.

Referring to Figs. 1 and 2, the pattern or patterns A are secured on a plate, D, which is moved vertically on guides $e$ by means of a lever, $g$, which is connected to the plate D by means of a link, $f$.

In moving the pattern or patterns A into the desired position it or they pass up through openings in plate C, on the upper side of which plate is formed the pattern for the gate or pouring-spine $h$. The lever $g$ is secured in position by means of a pin or key, $i$.

The plate C is secured to the upper end of the guides $e$, the lower ends of which are secured in the base of the machine.

The pattern or patterns A being in position, as shown in Fig. 2, the drag of the flask is arranged on the plate C, as indicated by the dotted line $x$ in Fig. 2. It is then rammed up, the pin or key $i$ withdrawn, and the lever $g$ pressed down, which withdraws the pattern or patterns A without the necessity of any rapping or jarring operation which would tend to make the mold untrue.

Referring to Figs. 3 and 4, which show my improved machine for forming the cope part of the mold, $p$ $p$ are vertical supports for the plate K, and also guides for the vertically-adjustable plate L, which is operated by a lever, $n$.

R represents a vertical standard, and J a sleeve, which, with the plate L, moves down over the standard R when the lever is depressed.

The lever $n$ is linked at $m$ to plate L, and is set in position by a pin, $o$, or by any equivalent locking device.

The flask is placed upon plate K and filled and rammed in the usual way. The two vertical dotted lines are intended to give the outlines of a portion of the flask, which is regarded as sufficient to enable those skilled in the art to understand the mode of operation.

After the core has been formed within sleeve J the plate L and said sleeve are lowered through the medium of lever $n$, whereby the core is freed from said sleeve and the cope part of the mold thus perfected.

The operation herein described of the machines will readily be understood by the skilled molder. The plates and pin of the two parts of the flask must be arranged with relation to each other and the plates C K of the machine so as to bring the core in the cope part of the flask in proper position with relation to the mold in the drag part of the flask, as represented in Fig. 5, which is a vertical section of the flask when the mold is formed.

I claim as my invention—

The sleeve J and plate L, constituting a sliding frame upon rods $p$, in combination with the stationary part R and operating-lever, substantially as shown and described, and for the purposes specified.

GEO. MATHESON.

Witnesses:
A. C. JOHNSTON,
A. S. H. JOHNSTON.